US006972056B1

(12) United States Patent
Delzeit et al.

(10) Patent No.: US 6,972,056 B1
(45) Date of Patent: Dec. 6, 2005

(54) CARBON NANOTUBE PURIFICATION

(75) Inventors: Lance D. Delzeit, Sunnyvale, CA (US); Clement J. Delzeit, Dodge City, KS (US)

(73) Assignee: The United States of America as represented by the Administration of the National Aeronautics and Space Administration, Washington, DC (US)

( * ) Notice: Subject to any disclaimer, the term of this patent is extended or adjusted under 35 U.S.C. 154(b) by 253 days.

(21) Appl. No.: 10/135,013

(22) Filed: Apr. 25, 2002

(51) Int. Cl.[7] .............................................. B08B 7/04
(52) U.S. Cl. ................ 134/1; 134/1; 134/2; 134/22.11; 134/22.15
(58) Field of Search ............................. 134/1, 2, 22.11, 134/22.15, 19, 25.4; 427/534, 535, 444, 903; 423/447.1, 447.2, 447.3, 445 B

(56) References Cited

U.S. PATENT DOCUMENTS

| | | | | |
|---|---|---|---|---|
| 5,641,466 | A * | 6/1997 | Ebbesen et al. | 423/447.2 |
| 6,752,977 | B2 * | 6/2004 | Smalley et al. | 423/447.1 |
| 2002/0092984 | A1 * | 7/2002 | Colbert et al. | 250/306 |
| 2003/0042128 | A1 * | 3/2003 | Harutyunyan et al. | 204/158.2 |

OTHER PUBLICATIONS

Gorelik et al,. Purification Procedures for Single-Wall Carbon Nanotubes, NASA/CR-2000-208926, May, 2001.*
Hernadi et al., "Reactivity of different kinds of carbon during oxidative purification of catalytically prepared carbon nanotubes" Solid State Ionics 141-142, pp. 203-209, 2001.*
Tohji et al., "Extraction of exotic fullerenes and purification of single-walled nanotubes," Fullerene Science and Tecnology vol. 7, No. 4, pp. 665-679, Jul. 1999.*
Ko et al., "Highly efficient microwave-assisted purification of multiwalled carbon nanotubes," Microelectronic Engineering 73-74, pp. 570-577, Jun. 2004.*
S.B. Hawthorne et al, "Extraction of Organic Pollutants from Env." Analytical Chemistry, vol. 66 (1994) pp. 2912-2920.
G.L. Bakker et al, "Surface Cleaning and Carbonaceous Film . . . " Jour Electrochem Soc. vol. 145 (1998) pp. 284-291.
Young Soo Park et al, "High yield purification of multiwalled . . . " Carbon vol. 39 (2001) pp. 655-661.
M. Monthioux et al, "Sensitivity of single wall carbon nanotubes" Carbon vol. 39 (2001) pp. 1251-1272.
R. Andrews et al, "Purification and structural annealing of . . . " Carbon vol. 39 (2001) pp. 1681-1687.
P.X. Hou et al, "Multi-step purification of carbon nanotubes" Carbon vol. 40 (2002) pp. 81-85.

(Continued)

*Primary Examiner*—Alexander Markoff
(74) *Attorney, Agent, or Firm*—Robert M. Padilla; John F. Schipper

(57) ABSTRACT

A method for cleaning or otherwise removing amorphous carbon and other residues that arise in growth of a carbon nanotube (CNT) array. The CNT array is exposed to a plurality of hydroxyls or hydrogen, produced from a selected vapor or liquid source such as $H_2O$ or $H_2O_2$, and the hydroxyls or hydrogen (neutral or electrically charged) react with the residues to produce partly or fully dissolved or hydrogenated or hydroxylizated products that can be removed or separated from the CNT array. The hydroxyls or hydrogen can be produced by heating the CNT array, residue and selected vapor or liquid source or by application of an electromagnetic excitation signal with a selected frequency or range of frequencies to dissociate the selected vapor or liquid. The excitation frequency can be "chirped" to cover a selected range of frequencies corresponding to dissociation of the selected vapor or liquid. Sonication may be used to supplement dissociation of the $H_2O$ and/or $H_2O_2$.

2 Claims, 7 Drawing Sheets

OTHER PUBLICATIONS

K. Hernadi et al,"Reactivity of different kinds of carbon during . . . " Solid State Ionics vol. 141-142 (2001) pp. 203-209.

A. Koshio et al, "Thermal degradation of ragged single wall . . . " Chem. Phys. Lett. vol. 341 (2001) pp. 461-466.

Jeong-Mi Moon, "High Yield Purification of Singlewalled . . . " Jour. Phys. Chem. B, vol. 105 (2001) pp. 5677-5681.

I.W. Chiang et al, "Purification and Characterization of Single . . . " Jour. Phys. Chem B vol. 105 (2001) pp. 8297-8301.

W.L. Suchanek et al, "Stability of fullerenes under hydrothermal" Jour. Mater. Res. vol. 14 (1999) pp. 323-326.

J.L. Zimmerman et al "Gas-Phase Purification of Carbon Single . . . " Chem. Mater. vol. 12 (2000) pp. 1361-1366.

* cited by examiner

CARBON NANOTUBE PURIFICATION

FIELD OF THE INVENTION

This invention relates to growth and clean-up of carbon nanotubes.

BACKGROUND OF THE INVENTION

Development of carbon nanotubes (CNTs), including single-wall and multi-wall nanotubes and nanofibers, into useful devices requires fabrication of CNTs that are relatively free from process residues, such as amorphous carbon and metallic particles that are not part of a CNT array grown on a (coated) substrate. Conventional techniques for removal of amorphous carbon and other residues often use one of several techniques. A first technique uses post-growth thermal or plasma cleaning of the amorphous carbon with $O_X$ (x≈2), which non-selectively attacks the CNT material as well as the amorphous carbon. Metal contaminants are removed using an acid bath, which is again a non-selective process and requires disposal of the strong acids and contaminant removal by-products. A second technique uses certain toxic gases, such as halogens, to remove the amorphous carbon and other residues. This approach requires disposal of one or more hazardous substances and often requires many hours to complete. A third approach requires holding the amorphous carbon and CNTs in a heated $O_X$ atmosphere for several hours, in order to limit the damage to the CNTs. Each of these techniques is either non-selective, damages the CNTs, requires use and disposal of strong acids and/or other toxic fluids (liquids or gases), and/or requires lengthy time intervals for processing.

What is needed is an in situ approach that allows clean-up of unwanted material, such as amorphous carbon, after an array of carbon nanotubes has been grown, that does not damage the nanotubes and that does not use harsh or toxic chemicals. Preferably, the unwanted material should be substantially separated and isolated from the nanotube array after the clean-up. Preferably, the approach should not require more than one hour to complete and should not require use and/or disposal of any hazardous substances.

SUMMARY OF THE INVENTION

These needs are met by the invention, which provides a combined chemical and physical, nondestructive method for removing unwanted material from an array of carbon nanotubes. In one embodiment, the method relies upon a hydrolizing nature of high temperature water vapor (or $H_2O_2$) to selectively dissolve and/or hydrogenate and/or hydroxylate amorphous carbon and metal particles that remain after an army of carbon nanotubes (CNTs) has been grown on a (coated) substrate. Optionally, this clean-up procedure is implemented immediately after the CNTs have been grown, and either before or after cool-down of the chamber containing the CNTs. An inert gas, such as Ar or Xe or $N_2$, is preferably flowed through the chamber to purge the chamber of oxygen. Alternatively, a vacuum, with associated pressure in a range 0.00001-1 Torr or lower, is used to purge the chamber of oxygen.

In one embodiment, the CNTs and the residues (amorphous carbon, oxidized carbon, metal particles, metal composites, etc.) are (re)heated in the chamber to a temperature range T=50–850° C., together with a source of hydroxyls or hydrogen (e.g., water vapor or $H_2O_2$ vapor, exposed to heating or to radiofrequency, microwave energy, infrared, visible or ultraviolet radiation (referred to collectively herein as "em. radiation"), at a pressure in a range p=0.02–15 psi, or higher or lower if desired. The water vapor or $H_2O_2$ vapor used here must be substantially free of oxygen ($O_2$) and may be prepared using a repeated freeze-evacuation-thaw process, with p(evac)$\leq 10^{-4}$ Torr for a time interval $\Delta t \geq 10$ sec. for an initial volume of water that iteratively removes increments of residual oxygen from the initial liquid volume until no more than a very small fraction of a percent of free oxygen remains in the processed vapor. Alternatively, an inert gas, such as $N_2$ or a noble gas (e.g., Ar), can be bubbled through the liquid to remove most of the $O_2$.

The vapor in the chamber is heated or exposed to electromagnetic radiation and is allowed to react with the amorphous carbon and metallic particles to produce dissolved or hydrogenated and/or hydroxylated amorphous carbon and metallic particles. The heated or energized vapor has little or no effect on the CNTs so that the CNTs are substantially unchanged after the water vapor or $H_2O_2$ vapor is applied. The chamber contents are then cooled to a lower temperature and are removed. The processed residues are then separated relatively easily from the CNTs in the chamber, for example, as waste gas.

As the temperature for water vapor (and, as far as can be determined, for $H_2O_2$ vapor) increases, the relative dielectric coefficient of the vapor tends toward 1, which allows the vapor to selectively dissolve more non-polar substances. At a sufficiently high temperature and pressure, the water vapor or $H_2O_2$ vapor can dissolve, and allow removal of, amorphous carbon, and can hydrolize amorphous carbon while leaving the graphitic structure of CNTs relatively unaffected.

The dissolved and/or hydrogenated and/or hydroxylated residues (amorphous carbon, metallic particles, etc.) are removed or otherwise isolated from the CNT array, for example, by removal as a waste gas. The chamber and its remaining contents are cooled to a selected lower temperature in a range (e.g., $T \leq 300°$ C.) and the CNT array, thus cleaned, is removed. Removal of the residues is confirmed by comparing photomicrographs of a CNT array taken before and after processing: in the "before" image, the diameters of at least some of the CNTs are noticeably larger than the diameters of the corresponding CNTs in the "after" image.

DESCRIPTION OF BEST MODES OF THE INVENTION

Figure 1:
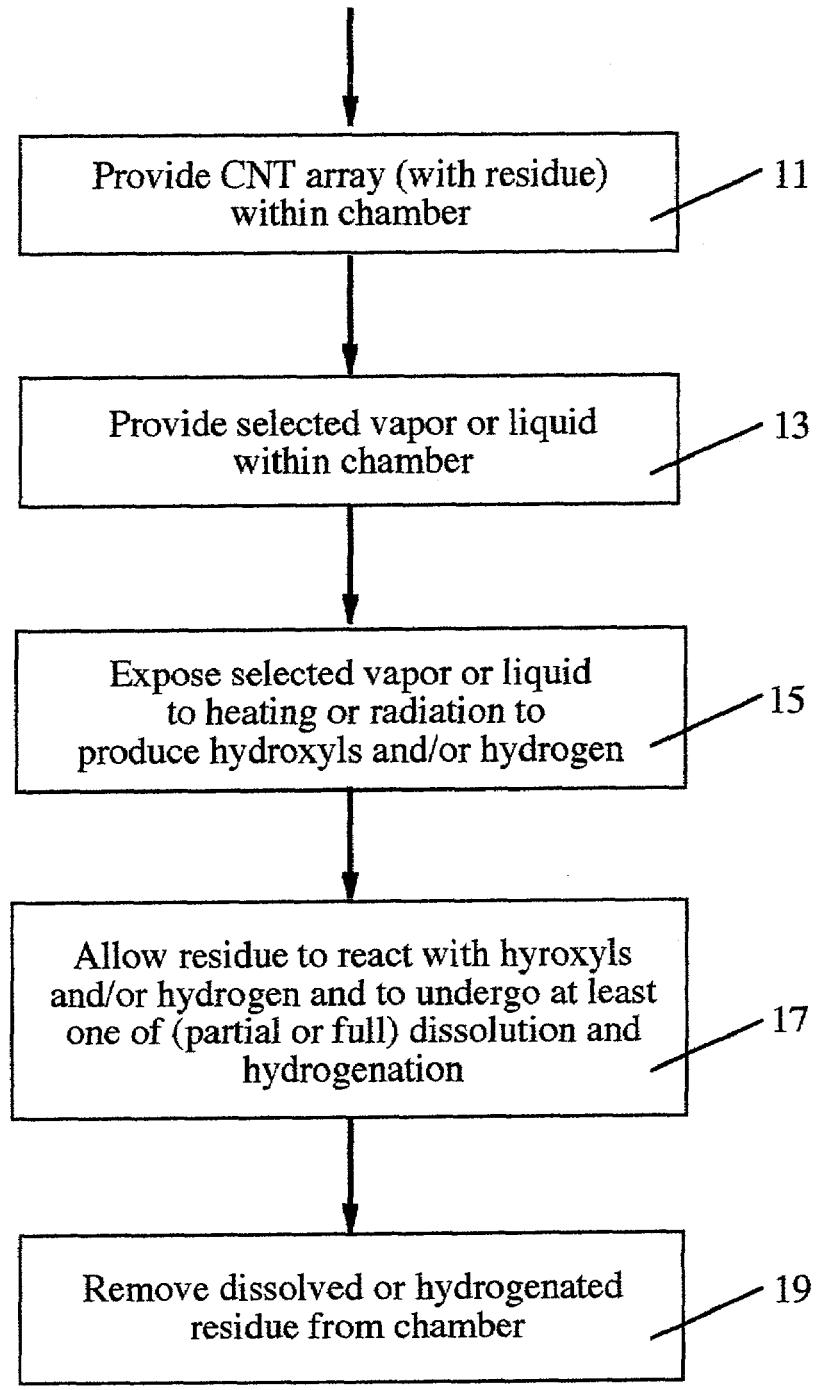
FIG. 1 is a flow chart illustrating practice of the invention.

FIG. 1 is a flow chart of a method for practicing the invention. In step 11, an array of CNTs is provided within a chamber. The CNT array may have residues, including but not limited to amorphous carbon and metal particles, adjacent to or on one or more of the CNTs in the array. In step 13, a selected vapor of liquid, including at least one of $H_2O$ and $H_2O_2$, is provided within the chamber. In step 15, the selected vapor or liquid is exposed to heating or to radiation to produce at least one of H, $H^+$, OH and $OH^-$. If the source of hydroxyls or hydrogen is $H_2O_2$, the source should also be substantially free of halogens and alkali halides, if hydroxyls are desired. Presence of a halogen (e.g., $Br_2$) or of an alkali halide (e.g., KI) will cause $H_2O_2$ to preferentially dissociate (undesirably) into $H_2O$ and $(\frac{1}{2})O_2$, rather than into OH+OH. An example of a dissociation reaction for $H_2O_2$ in the presence of a halogen is discussed by P. W. Atkins in *General Chemistry*, Scientific American Books, 1989, p 467. Where water vapor is used, no such precaution is necessary. Alternatively, a heated and pressurized liquid form of $H_2O$ or $H_2O_2$ may be provided in the chamber.

In step 17, the residue is allowed to react with the hydroxyls or hydrogen and to undergo at least one of the processes of (i) partial or full dissolution of at least one residue through combination with hydroxyls or hydrogen, (ii) partial or full hydrogenation of at least one residue, and (iii) partial or full and/or hydroxylation, through combination with hydroxyls or hydrogen, thereby producing processed residues. In step 19 (optional), the processed residue is removed as a fluid (e.g., gas or liquid) from the chamber, either contemporaneous with, or before or after, removal of the cleaned CNT array from the chamber.

In a first embodiment, the CNT array and residues are heated in water vapor (at a pressure greater than, equal to or less than atmospheric) to a temperature in a selected range, such as T=100–850° C., and hydroxyls or hydrogen or other components produced by dissociation of the water vapor react with the amorphous carbon and other residues to produce removable products. In an alternative to the first embodiment, the CNT array and residues are heated to a similar temperature range in $H_2O_2$ or in another source of hydroxyls or hydrogen (neutral or electrically charged), and the vapor dissociation products react with the amorphous carbon and other residues to again produce removable products.

In a second embodiment, the CNT array and residues are exposed to a heated or super-heated) liquid containing water in a selected temperature range, such as T=50–850° C., and the heated water in the liquid is allowed to react with and (partially) dissolve and/or hydrogenate and/or hydroxylate the residues, using a procedure similar to that used for the selected vapor.

In a third embodiment, a selected vapor or liquid containing $H_2O$ and/or $H_2O_2$ is exposed to em. radiation (rf, microwave, infrared, visible or ultraviolet; $\lambda$=100 nm–1 meter)) in a selected frequency range, in a chamber containing the CNT array and residues, in order to preferentially dissociate the water (vapor or liquid) to H+OH (neutral or electrically charged), or to preferentially dissociate the $H_2O_2$ to OH+OH (neutral or electrically charged). This may include photodissociation, using uv. or vacuum uv. radiation. Once the hydroxyls or hydrogen are produced, conversion of amorphous carbon and other residues to removable products proceeds as in the first embodiment. According to spectra presented in C. N. Banwell, Fundamentals of Molecular Spectroscopy, McGraw Hill, Second Ed., 1972, an H—OH vibrational or electronic reaction (which may result in dissociation) has several strong bands of energies, as does an HO—OH vibrational or electronic reaction. However, this applies to a relatively free water molecule. A group of water molecules in the presence of other substances may have altered dissociation requirements.

Because each of these molecules has several bands of energies that lead to dissociation, it may be preferable to apply a "chirped" em. signal to the $H_2O$ or $H_2O_2$ vapor, wherein a frequency of excitation is varied with time, continuously or discretely, between a lower limit f(min) and a maximum frequency f(max) within a band of interest or between two or more such bands. The frequency may vary monotonically or periodically or according to a selected polynomial or transcendental function of time.

Where $H_2O_2$ is to serve as a source of the hydroxyls, formation of OH+OH will compete with formation of $H_2O+(\frac{1}{2})O_2$, and formation of $H_2O+(\frac{1}{2})O_2$ will be favored in a slower, near-equilibrium reaction. In this situation, it may be preferable to apply a short, intense (optionally chirped) dissociation energy field in an appropriate frequency range to $H_2O_2$ in order to initially produce HO+OH in preference to producing $H_2O+(\frac{1}{2})O_2$.

Where a selected liquid is used, in embodiments 2 and 3, ultrasound or another sonication process can be used to supplement the heating and/or radiation process to further promote dissociation or a related reaction to provide the hydroxyls and/or hydrogen.

Figure 2:
FIGS. 2, 4 and 6 are photomicrographs of CNT arrays before application of the procedures disclosed herein.
Figure 3:
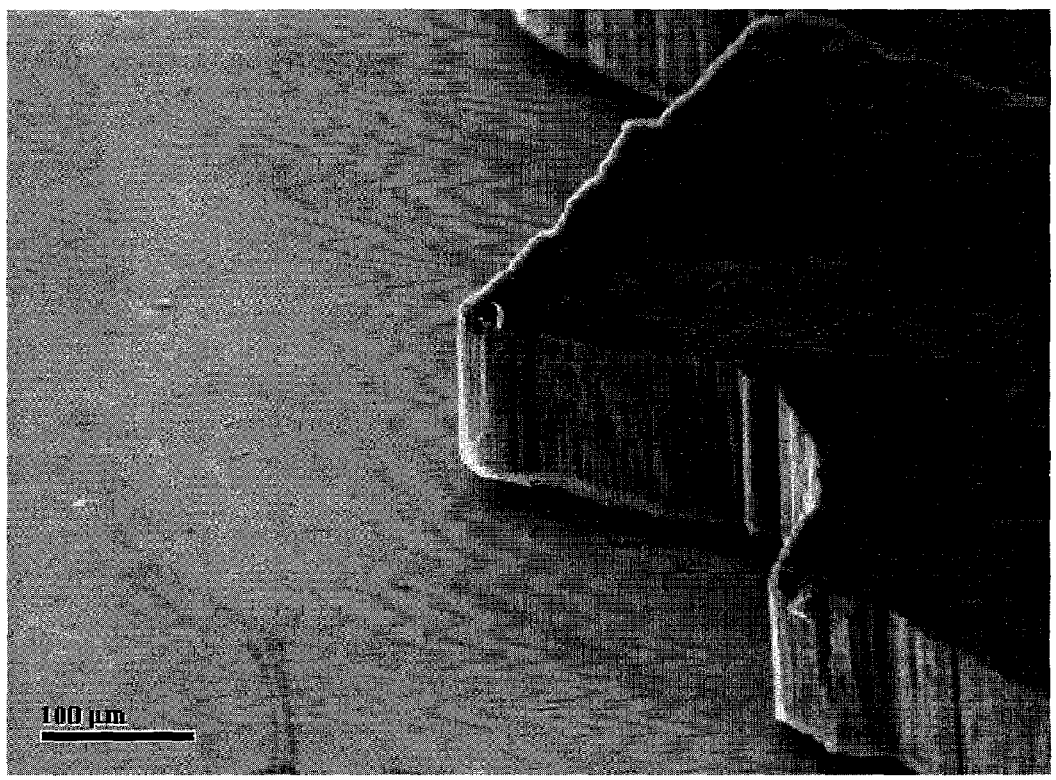
FIGS. 3, 5 and 7 are photomicrographs of the CNT arrays shown in FIGS. 2, 4 and 6, respectively, after application of a procedure disclosed herein.

FIG. 2 is a photomicrograph of a multi-wall nanotube ("MWNT") array, with amorphous carbon and other residues present (the trapezoidal-shaped black region to the left of center of the image). FIG. 3 is a photomicrograph of the same array after the invention is applied to remove the residues, resulting in a relatively clean region in the left half of the image. As far as can be determined from a comparison MWNT arrays in FIGS. 2 and 3, the MWNT array to the right of center in these two images is substantially unaltered.

Figure 4:
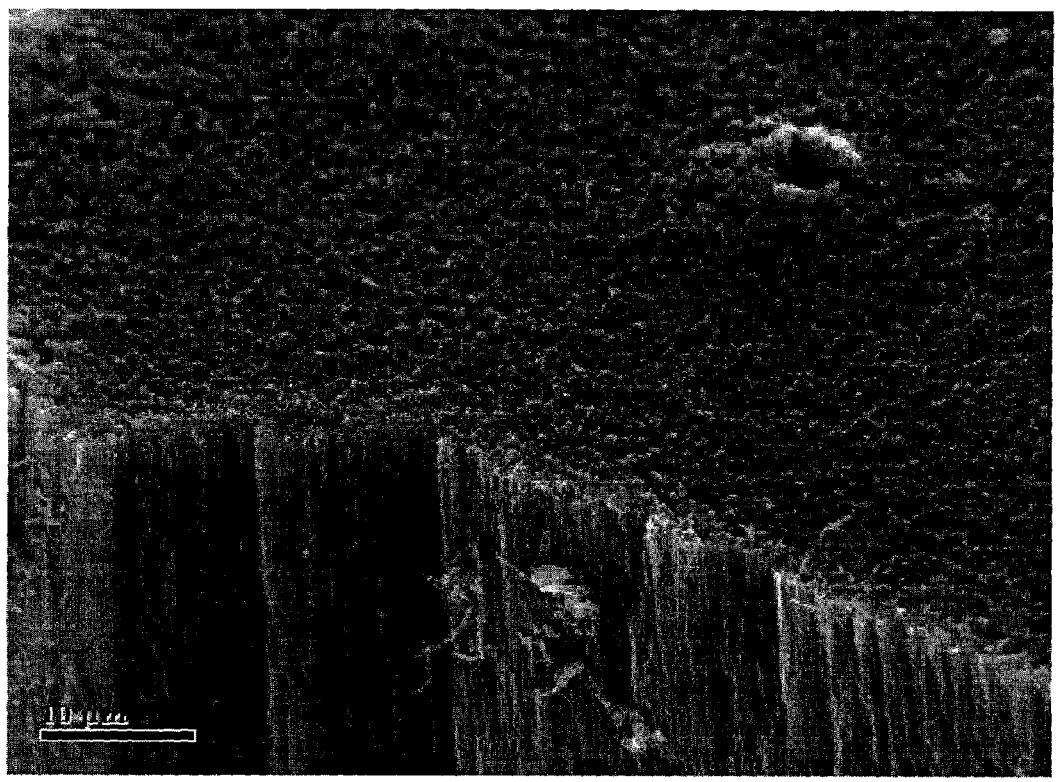
Figure 5:
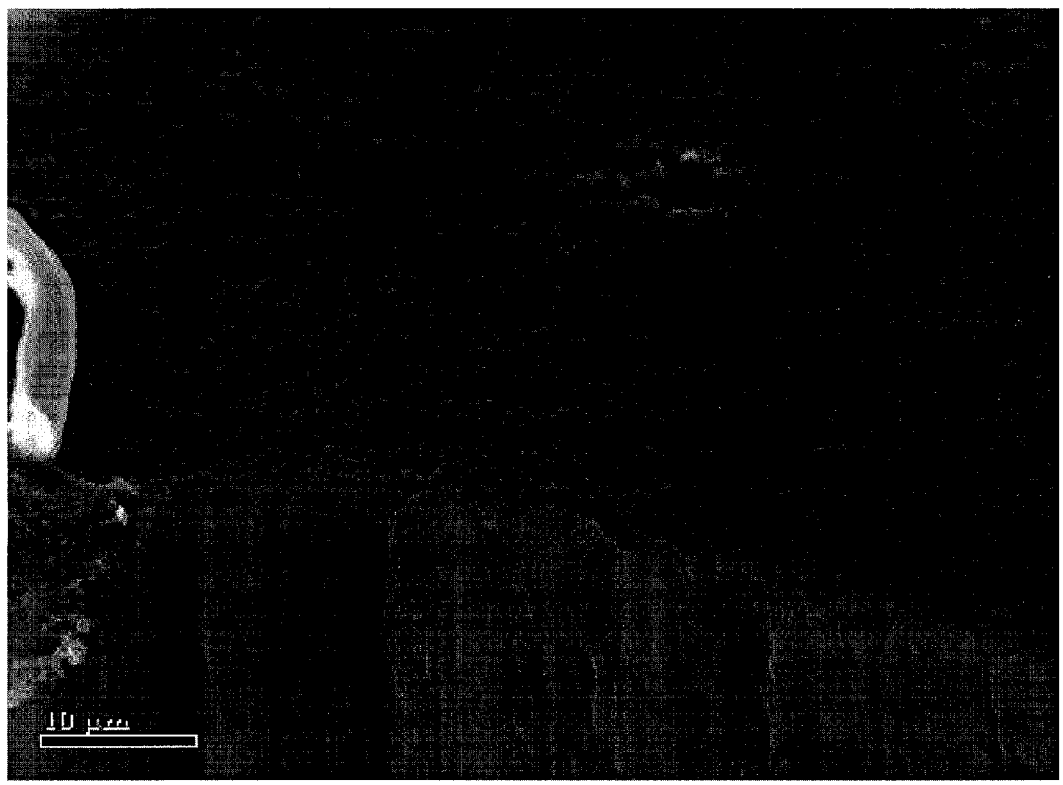

FIGS. 4 and 5 are "before" and "after" photomicrographs of residues located on top of, and removed from, an MWNT array, respectively. Note that a circular-shaped artifact appearing near the upper right corner in FIG. 4 ("before") also appears in the same location near the upper right corner in FIG. 5 ("after").

Figure 6:
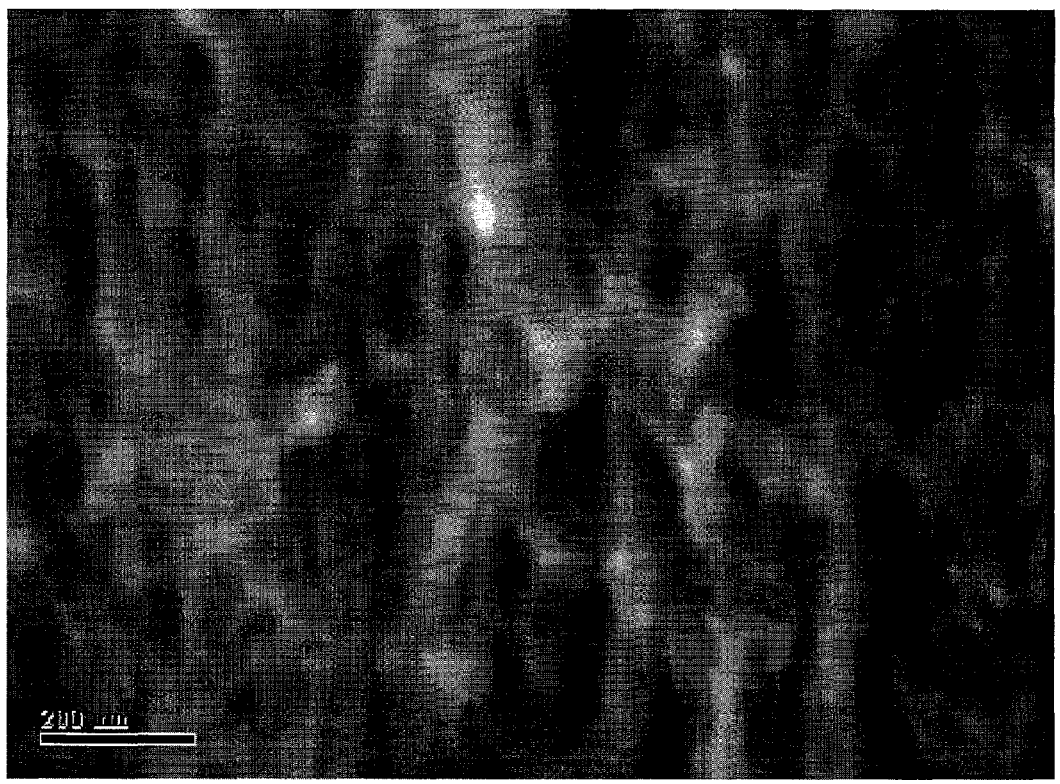
Figure 7:
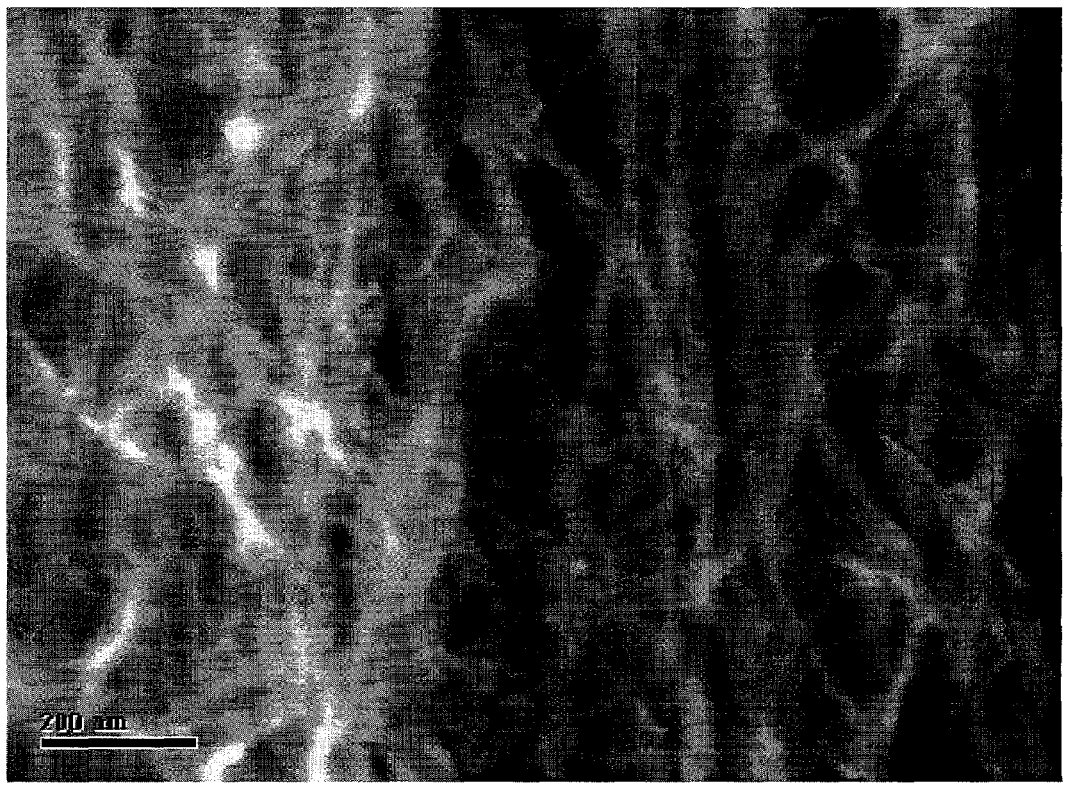

FIGS. 6 and 7 are "before" and "after" photomicrographs of a side view of an MWNT array. Far more detail is visible in FIG. 7 ("after"), which is believed to be due to removal of most of the residue so that the individual nanotubes can be seen somewhat more clearly.

What is claimed is:

1. A method for removing residue after growth of an array of carbon nanotubes, the method comprising:

providing in a chamber an array of carbon nanotubes, referred to as "CNTs," which may have at least one residue from growth of the CNTs;

providing within the chamber a selected vapor or liquid containing at least one of water vapor and $H_2O_2$ at a selected pressure;

exposing the selected vapor or liquid to chirped radiation having a frequency that is continuously or discretely varied between a lower frequency limit and an upper frequency limit to induce at least a portion of the selected vapor or liquid to dissociate into vapor components containing at least one of OH, $OH^-$, H and $H^+$; and allowing the at least one residue to react with the selected vapor or liquid and to undergo at least one of the processes (i) at least partial dissolution of the at least one residue in the selected vapor or liquid, (ii) at least partial hydrogenation of the at least one residue through exposure to the selected vapor or liquid, and (iii) at least partial hydroxylization of the at least one residue through exposure to the selected vapor or liquid.

2. The method of claim 1, further comprising applying sonication to said selected liquid before or at a time contemporaneous with allowing said residue to react with said selected liquid.

* * * * *